United States Patent Office 3,548,440
Patented Dec. 22, 1970

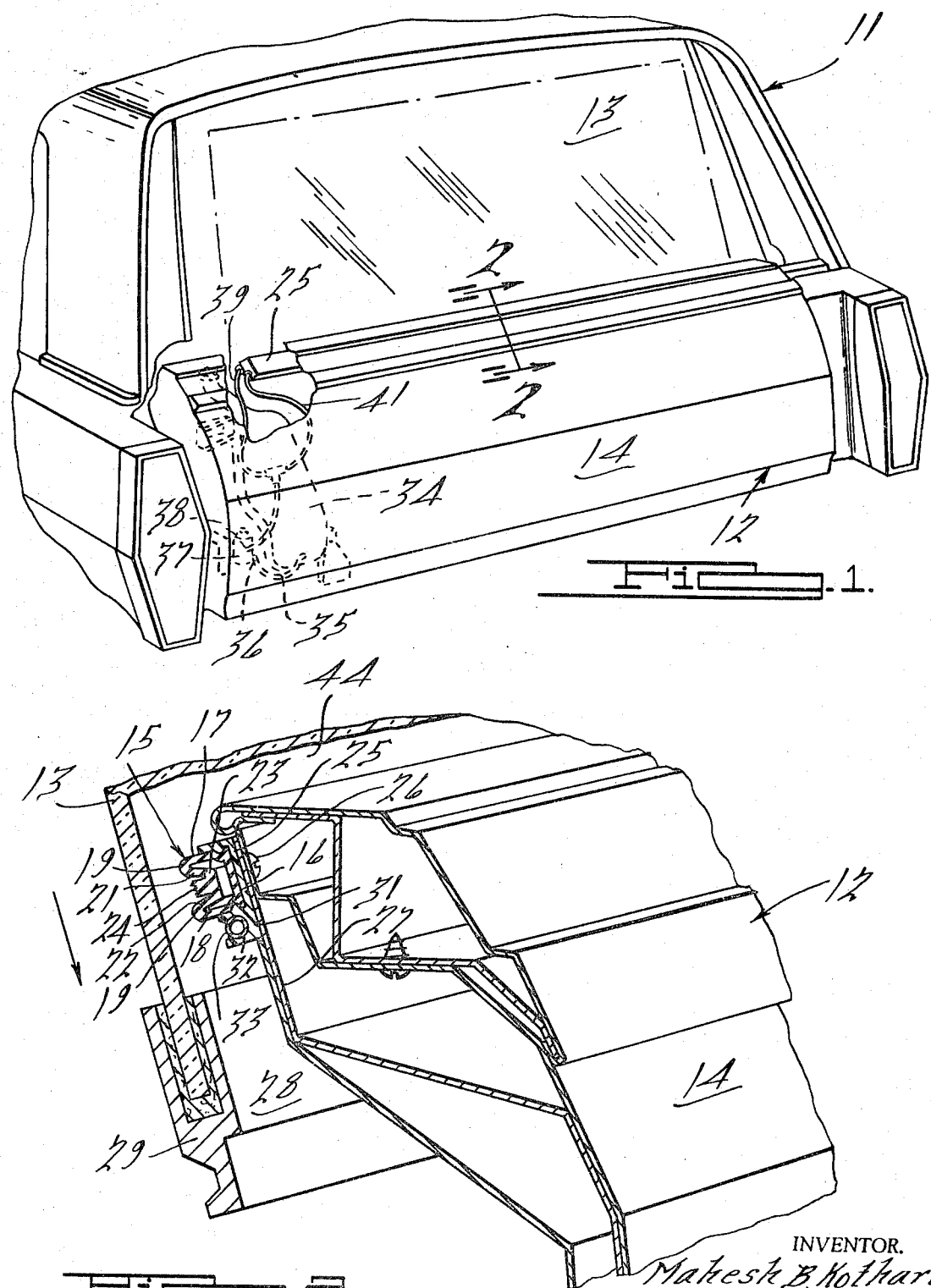

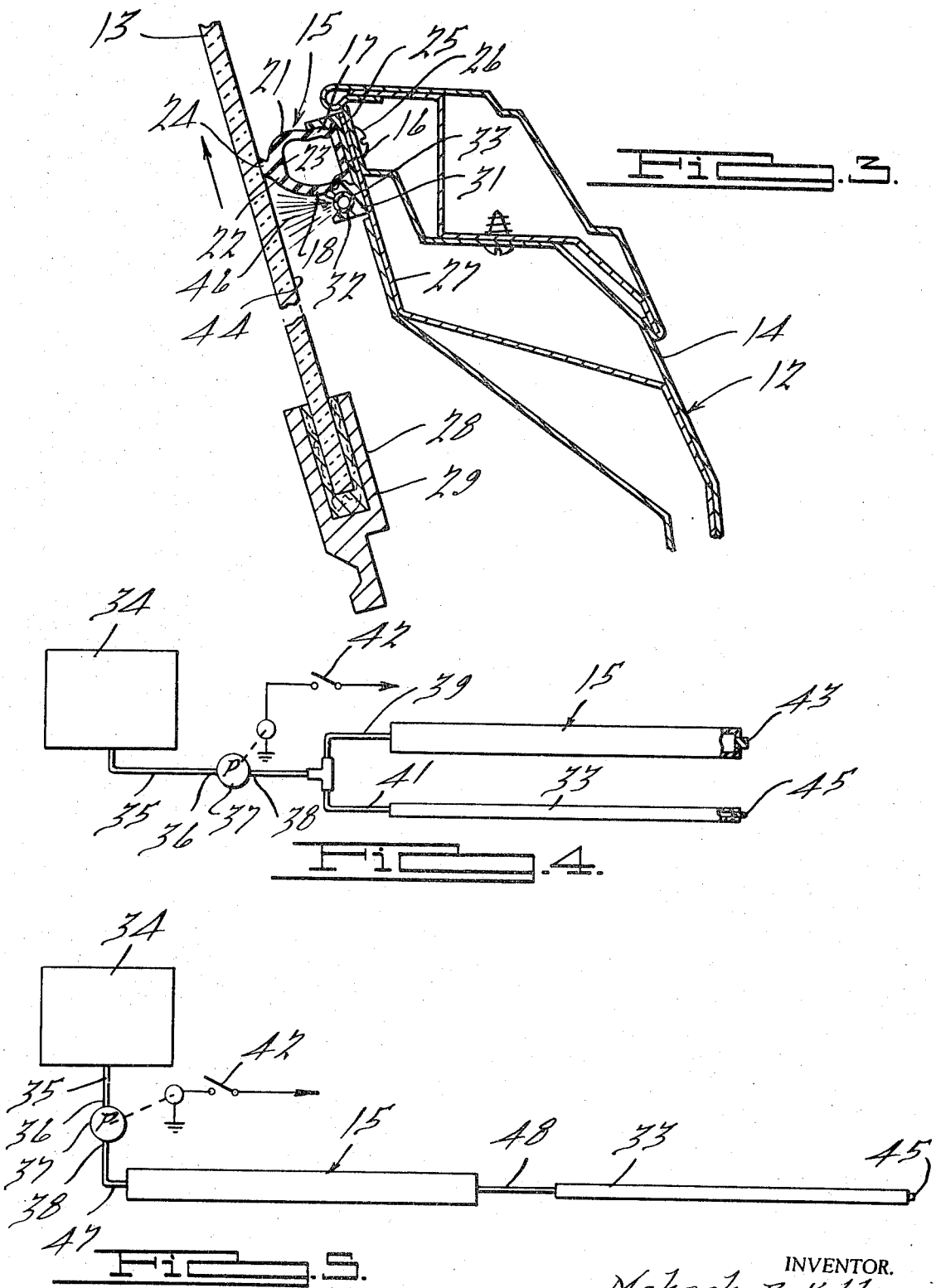

3,548,440
WINDOW CLEANING SYSTEM
Mahesh B. Kothari, Detroit, Mich., assignor to Ford Motor Company, Dearborn, Mich., a corporation of Delaware
Filed Mar. 26, 1969, Ser. No. 810,580
Int. Cl. B60s 1/46
U.S. Cl. 15—250.01                 6 Claims

ABSTRACT OF THE DISCLOSURE

The window cleaning system comprises an elongated inflatable member carrying a squeegee and extending substantially across the width of a movable window. Contiguous to the inflatable member is a fluid dispensing conduit having a plurality of spray apertures. Washer solvent fluid under pressure is utilized to inflate the inflatable member and is dispersed through the spray apertures of the fluid dispensing conduit so that the window surface can be wetted and wiped as it moves past the fluid dispensing conduit and squeegee, respectively.

BACKGROUND OF THE INVENTION

The reciprocable rear window of one popular type of vehicle body, the station wagon, has long presented a problem with regard to the maintenance of clear vision through the window. The windshield of a vehicle can be cleaned by liquid sprayed thereon and squeegeed by the windshield wipers. The side windows are in the main protected from dust accumulation by the air stream created by the vehicle movement. The substantially vertical rear window of a station wagon, however, is in a low pressure area of the air stream over the vehicle body. Even if wind deflectors are used on the rear of the vehicle, the window still has a particular affinity for collecting dirt and grime.

It has been proposed to mount on the vehicle body fluid spray nozzles that are directed toward the rear window and to provide conventional type windshield wiper blade mechanism for removing the wetted dirt and grime from the window surface. Such an arrangement has several disadvantages. The wiper area of oscillating windshield wiper blades of the type used on the front windshields of vehicles is somewhat limited. This limited wipe pattern becomes particularly noticeable when such wipers are used on the large rear windows used in station wagon tailgates. Also, complex controls must be incorporated into the system to insure that washer fluid is not squirted into the vehicle interior or that the wiper blades are not actuated when the window is in a lowered position.

Preferably, the fluid dispensing apparatus and the wiper blade or squeegee supporting means should be protected from possible damage when the tailgate is in a cargo loading or load carrying position. This is difficult to do with the oscillating type wiper systems.

It is an object of the present invention to provide a rear window washing and wiping cleaning system having its components constructed and arranged to avoid the disadvantages of known systems and to provide a concealed and protected system.

SUMMARY OF THE INVENTION

The window cleaning system or unit embodying the present invention has particular utility with a window reciprocably movable into and out of a window well, such as a rear window mounted in a tailgate of a station wagon. The window cleaning system or unit comprises an elongated inflatable member and a squeegee carried on the inflatable member. A fluid dispensing conduit having a plurality of spray apertures extends in substantially parallel relationship to the elongated inflatable member. The inflatable member and squeegee are carried on a retainer which fixedly supports the two components in contiguous relationship to each other and to the window surface. A source of washer solvent is connected to the fluid dispensing conduit and to the inflatable member. A pump pressurizes the washer solvent for dispersal through the spray apertures of the fluid dispensing conduit and also to inflate the inflatable member to project the squeegee into engagement with the window surface.

The window surface is thus adapted to be wetted and wiped as it moves past the fluid dispensing conduit and squeegee, respectively.

The inflatable member and the fluid dispensing conduit may be connected in parallel or in series to the discharge outlet of the pump.

DESCRIPTION OF THE DRAWINGS

Other objects, advantages and features of the present invention can be made more apparent as this description proceeds, reference being had to the accompanying drawings, wherein:

FIG. 1 is a fragmentary perspective view of the rear end of a vehicle body of the station wagon type illustrating the environment in which the present invention is to be used;

FIG. 2 is a section view on the line 2—2 of FIG. 1;

FIG. 3 is a view in part similar to FIG. 2 illustrating the parts of the window cleaning system in a second position of operation; and FIGS. 4 and 5 are diagrammatic views illustrating the squeegee carrying member and the fluid dispensing conduit coupled to the washer solvent pressurizing pump in parallel and in series, respectively.

DETAILED DESCRIPTION OF THE INVENTION

Referring now to the drawing, and more particularly to FIG. 1, there is illustrated the rear end of a station wagon body 11 fitted with a tailgate 12 having a window 13 which may be lowered into or raised out of a window well formed by conventional inner and outer panels of the tailgate. Only the outer panel 14 is visible in the drawings. The mechanism for lowering and raising the window forms no part of the present invention and it will be understood that any conventional power window regulator mechanism may be used.

The window cleaning unit for cleaning the window 13 comprises an elongated elastomeric member, generally designated 15. The elastomeric member 15 is a hollow extrusion of polypropylene plastic or rubber material and is inflatable. The cross-sectional contour in noninflated condition is best seen in FIG. 2. The elastomeric member 15 has a flanged base 16 and substantially parallel side walls 17 and 18 extending normally to the base 15. The side walls terminate in rounded corners 19 integral with inwardly inclined walls 21 and 22 which are joined by a rib 23 substantially paralleling the base 16. The rib 23 is a platform for an upstanding longitudinally extending serrated rib 24. This rib 24 in noninflated condition of the elastomeric member 15 is thus pocketed in a longitudinal recess between the side walls 17 and 18. In inflated condition of the elastomeric member 15, the rib 24 is projected out of the longitudinal recess into a position in which it is adapted to function as a squeegee, as will be more fully explained.

The elastomeric member 15 is supported through its flanged base 16 on a longitudinally extending retainer 25 secured by screws of the like 26 to a sill structure wall 27 of the outer tailgate panel 14. The apex surfaces of the rounded corners 19 in deflated condition of the member 15 are adapted to engage the surface 28 of the window frame 29 so as to function in raised position of the window 13 as a seal in the window well gap between the window structure and the sill structural wall 27.

The retainer 25, which also preferably is formed of extruded plastic, has an extension 31 having a longitudinally extending pocket 32 therein in which is carried a fluid dispensing conduit 33 having a plurality of longitudinally spaced spray apertures (not visible). The retainer 25 thus fixedly supports the inflatable elastomeric member 15 and the fluid dispensing conduit in contiguous superposed relationship to each other and to the opposed surface of the window 13.

Referring now to FIGS. 1 and 4, a reservoir 34 adapted to contain the window washer solvent is coupled by a hose or tubing 35 to the intake side 36 of an electrically driven pump 37. The discharge side of the pump 38 is coupled by parallel branch tubing sections 39 and 41 to the elongated elastomeric member 15 and the fluid dispensing conduit 33. The energization of the pump is controlled by a switch 42 located in a position convenient to the vehicle operator.

The operation of the window cleaning system embodying the present invention is put into operation preferably as follows:

When the window 13 is lowered into the tailgate, its upper horizontal edge is in contiguous relationship to the elastomeric member 15 and the fluid dispensing conduit 33. Actuation of switch 42 places the pump 37 in operation. The pump 37 drawing fluid from the reservoir 34 places the fluid under pressure and forces the same through the branch sections of tubing 39 and 41, respectively. The elongated elastomeric member 15 is capped at its end 43. Since the fluid has no place to go it causes the elastomeric member 15 to expand which in turn results in the squeegee 24 popping out of the recess formed by the inclined walls 21 and 22 so that the elastomeric member assumes the shape shown in FIG. 3. This results in the squeegee portion or serrated rib portion 24 making contact with the outer surface 44 of the window 13. Simultaneously, fluid under pressure is being pumped into the fluid dispensing conduit 33 which is also capped at its opposite end 45. Since the fluid dispensing conduit is provided with a series of apertures this results in a spray of washer solvent, as indicated at 46, on the surface 44 of the window 13. As the window is raised, the washer solvent and the dirt and grime loosened thereby are squeegeed from the window surface by the serrated rib or squeegee portion 24 of the elongated elastomeric member 15.

It may be necessary to repeat the up and down movement of the window several times to insure that it is adequately cleaned. Although the circuitry is not shown, it is believed readily apparent that the pump motor switch 42 may be placed in series with the tailgate window operating switch so that the pump motor only may be energized when the window lifting mechanism operating switch is actuated to raise the window. This would help to conserve solvent since the wet squeegee action takes place only on the upstroke of the window.

When the pump 37 is stopped, the pressure in the system rapidly diminishes and the elastomeric member 15 collapses. The squeegee 24 pops back into recessed condition.

Referring now to FIG. 5, there is shown a second diagrammatic arrangement of the elongated elastomeric member and the fluid dispensing conduit. In this arrangement the pump discharge 38 is connected by tubing 47 to the elastomeric member 15 and the latter is then connected in series by a second piece of tubing 48 with only the far end of the fluid conduit 33 being capped as at 45.

Either system will generally provide the same end result, a clean tailgate window within the area shown in dot-dash outline in FIG. 1.

I claim:

1. A window cleaning unit for a window movable into and out of a window well, comprising:
    an elongated inflatable member,
    a squeegee carried on said inflatable member,
    a fluid dispensing conduit having a plurality of spray apertures,
    a retainer supporting said inflatable member and said fluid dispensing conduit in contiguous relationship to each other and to a window surface,
    a reservoir of washer solvent connected to the fluid dispensing conduit and to said inflatable member,
    and a pump for pressurizing the washer solvent for dispersal through said spray apertures and to inflate said inflatable member to project the squeegee into engagement with the window surface,
    said window surface being wetted and wiped upon movement past the fluid dispensing conduit and squeegee, respectively.

2. A window cleaning unit according to claim 1, in which:
    the reservoir of washer solvent and the pump are connected in series and the fluid dispensing conduit and the inflatable member are connected in parallel to the discharge side of the pump.

3. A window cleaning unit according to claim 1, in which:
    the reservoir of washer solvent, the pump, the inflatable member and the fluid dispensing conduit are connected in series.

4. A window cleaning system for a framed window reciprocably movable into and out of a window well defined by a vehicle body structure, comprising:
    an elongated inflatable sealing member,
    a fluid dispensing conduit having a plurality of spray apertures,
    a retainer secured to a wall of a vehicle body structure fixedly supporting said sealing member and said fluid dispensing conduit in superposed parallel relationship to each other and in contiguous relationship to a surface of a window,
    said sealing member having a sealing surface thereon which in deflated condition of the sealing member sealingly engages the frame of the window in raised position of the latter,
    squeegee means on said sealing member positioned in deflated position of the latter in recessed relationship to said sealing surface,
    a washer solvent reservoir,
    and a pump interposed between said reservoir and said inflatable sealing member and fluid dispensing conduit,
    said pump being operable to pressurize the washer solvent for dispersal through said spray apertures and to inflate said inflatable ceiling member to project the squeegee from its recessed position into window surface engageable position,
    said window surface being wetted and wiped as it moves across the fluid dispensing conduit and squeegee, respectively.

5. A window cleaning unit according to claim 4, in which:
   the reservoir of washer solvent and the pump are connected in series and the fluid dispensing conduit and the inflatable sealing member are connected in parallel to the discharge side of the pump.

6. A window cleaning unit according to claim 4, in which:
   the reservoir of washer solvent, the pump, the inflatable ceiling member and the squeegee are connected in series.

References Cited

UNITED STATES PATENTS

| | | | |
|---|---|---|---|
| 1,982,345 | 11/1934 | Kirby | 15—103X |
| 2,666,941 | 1/1954 | Oishei | 15—250.1 |
| 3,431,577 | 3/1969 | Minsky | 15—250.04 |

ROBERT W. MICHELL, Primary Examiner

U.S. Cl. X.R.

15—103, 250.1, 250.19